United States Patent [19]

Sweeney

[11] Patent Number: 4,545,856

[45] Date of Patent: Oct. 8, 1985

[54] STABLE SUBSTITUTED SUCCINIC ANHYDRIDE/ETHER-ESTER EMULSIFIER COMPOSITION AND METHODS FOR ITS USE

[75] Inventor: William A. Sweeney, Larkspur, Calif.

[73] Assignee: Chevron Research Company, San Francisco, Calif.

[21] Appl. No.: 584,380

[22] Filed: Feb. 28, 1984

[51] Int. Cl.$^4$ .............................................. D21H 3/08
[52] U.S. Cl. .................................... 162/158; 106/243; 162/179; 252/310; 252/311; 252/312; 427/384; 427/394; 427/395
[58] Field of Search ....................... 162/158, 179, 135; 252/310, 311, 356, 312, 353, 357; 562/595; 549/255; 106/243; 427/384, 394, 395; 8/116 R

[56] References Cited

U.S. PATENT DOCUMENTS

Re. 29,960 4/1979 Mazzarella et al. ................. 162/158

Primary Examiner—Peter Chin
Attorney, Agent, or Firm—D. A. Newell; C. J. Caroli

[57] ABSTRACT

A stable hydrocarbyl-substituted succinic anhydride/-polyethyleneoxy-containing ether-ester emulsifier composition. There is also disclosed a method for imparting water repellency to surfaces containing groups reactive to anhydrides and a method for the sizing of paper using said composition.

16 Claims, No Drawings

STABLE SUBSTITUTED SUCCINIC ANHYDRIDE/ETHER-ESTER EMULSIFIER COMPOSITION AND METHODS FOR ITS USE

BACKGROUND OF THE INVENTION

This invention relates to a stable hydrocarbyl-substituted succinic anhydride/emulsifier composition. This invention also relates to an improved method for imparting water repellency to surfaces containing groups reactive to anhydrides. A further aspect of this invention relates to an improved method for the sizing of paper and paperboard products.

It is well known in the art that hydrocarbyl-substituted succinic anhydrides are good for treating paper, fabric, or other surfaces to impart water repellency. As indicated in U.S. Pat. Nos. 3,102,064, 3,821,069, 3,968,005, and 4,040,900 (No. Re. 29,960), these compositions are particularly useful for sizing paper.

It is also known that these succinic anhydrides are best applied for such purposes in a highly dispersed form, such as an aqueous emulsion. See, for example, U.S. Pat. No. 4,040,900 (No. Re. 29,960), which describes paper sizing emulsions made from mixtures comprising a substituted cyclic dicarboxylic acid anhydride and polyoxyalkylene alkyl or alkylaryl ether or the corresponding mono- or di-ester.

Long-chain diester emulsifiers, as well as monoesters, alkyl phenol ethoxylates and alcohol ethoxylates, are disclosed in U.S. Pat. No. 4,040,900 (No. Re. 29,960) as useful emulsifiers for substituted succinic anhydrides.

A major drawback of these prior art emulsifiers is the fact that, once formed, the succinic anhydride-emulsifier mixtures are unstable and must be promptly used. There therefore exists a need in the art for substituted succinic anhydride-emulsifier mixtures which demonstrate enhanced stability upon aging or storage.

SUMMARY OF THE INVENTION

The present invention provides a stable hydrocarbyl-substituted succinic anhydride/emulsifier composition comprising:

(A) 70 to 99.5% of a normally liquid hydrocarbyl-substituted succinic anhydride containing from 6 to 50 carbon atoms in the substituent; and (B) 0.5 to 30% of an emulsifier of the formula:

$$R-W-Y_n$$

wherein R is a hydrophobic alkyl, alkylaryl, or arylalkyl group containing from 1 to 30 carbon atoms;

W is a water-soluble polyethyleneoxy-containing group having from 4 to 150 ethylene oxide units which is independently connected to R and Y through oxygen, sulfur or nitrogen linkages;

Y is an acyl capping group for the oxygen, sulfur or nitrogen linkages on W not connected to R, wherein Y contains from 10 to 40 carbon atoms;

n is ½, 1, 2, or 3;

and the hydrophile-lipophile balance (HLB) is between about 9 and 18.

The present invention further provides a method of imparting water repellency to surfaces containing groups reactive to anhydrides which comprises impregnating said surfaces with an aqueous emulsion of the substituted succinic anhydride/emulsifier composition of the invention.

The present invention is also concerned with a method of sizing paper which comprises intimately dispersing within the wet paper pulp, prior to the ultimate conversion of said pulp into a dry web, an aqueous emulsion of the substituted succinic anhydride/emulsifier composition of the invention.

Among other factors, the present invention is based on my discovery that certain derivatives of polyethyleneoxy-containing (or "polyethylene glycol-based") emulsifiers, wherein the free hydroxyl groups are capped with acyl carbon-containing groups, are surprisingly effective emulsifiers upon aging in substituted succinic anhydride. These emulsifiers provide stable mixtures with substituted succinic anhydride and do not react with the anhydride under storage conditions.

Advantageously, the substituted succinic anhydride-emulsifier mixtures of the present invention are highly effective in treating various surfaces to impart water-repellency. These compositions are particularly useful as superior paper sizing agents.

DETAILED DESCRIPTION OF THE INVENTION

The hydrocarbyl-substituted succinic anhydride useful for preparing the anhydride/emulsifier composition of the present invention is a hydrophobic molecule. Usually it will have one substituent in the 3-position, but it may have substituents in both the 3-and 4-positions. In general, the substituent will be an alkyl, alkenyl or aralkyl group. Other elements may be present in a minor amount, such as a sulfur or ether linkage. The total number of carbon atoms in the substituent is between 6 and 50. A preferred substituent size is between 10 and 30. More preferred is between 12 and 25. A preferred embodiment of the contemplated anhydrides is the alkenyl succinic anhydride made by allowing an olefin to react with maleic anhydride by the well-known "Ene" reaction. Also suitable is the "Diels-Alder" product derived from maleic anhydride and a conjugated diene. For the present purposes, I shall refer to the anhydrides contemplated as "ASA".

The emulsifier of the present composition possesses three essential properties. First, it is soluble in ASA at ambient temperatures. Secondly, it is stable to storage when dissolved in ASA. Thirdly, it has surfactant power to emulsify ASA in water. To satisfy these requirements, the present emulsifier contains no free —SH, —OH or —NH groups which could react with ASA and it has a hydrophile-lipophile balance (HLB) between about 9 and 18.

Generally, to achieve the desired HLB, the emulsifiers will contain between about 4 and 150 average moles of ethylene oxide, depending on the size of the lipophilic and other hydrophilic groups present. More commonly, the suitable range of moles of ethylene oxide employed will be from about 5 to 80.

The present emulsifier can be prepared from commercially available polyethylene glycol-derived emulsifiers which contain free hydroxyl groups and a preponderance of polyethylene glycol. These commercially available emulsifiers are themselves soluble in ASA and are modestly effective for emulsifying the anhydride in water. However, they are not stable in ASA on storage due to the presence of the hydroxyl groups. Examples of this class of hydroxyl-containing compounds include the polyethylene glycol derivatives of long-chain alcohols and alkylphenols, which are commonly used to emulsify oils in water. In general, these compounds will contain one free hydroxyl group and can be represented by the following formulae:

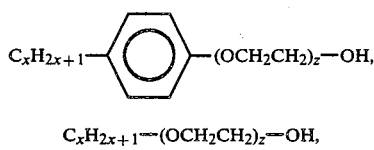

$$C_xH_{2x+1}-(OCH_2CH_2)_z-OH,$$

wherein x is an integer from 8 to 24 and z is an integer from 10 to 80. Typical commercial examples of these hydroxyl-containing emulsifiers include Igepal CO-850 and CO-880 (GAF), Triton X-305 (Rohm and Haas), Tergitol 15-S-20 and Tergitol 15-S-40 (Union Carbide).

Since the polyethylene glycol ((PEG)-containing material is capped with a large acyl group to form the emulsifier used in the present invention, it is not necessary for it to contain a large alkyl group. Therefore it is also suitable in the above formulas for X to equal 1 to 7. For example, ethoxylates from lower alcohols, such as methyl, ethyl, butyl, and the like, are suitable. Commercial examples are Carbowax MPG 550 and MPG 750 (Union Carbide). In this case, less ethylene oxide is needed to give the desired HLB and emulsifier performance.

In addition to the above monohydroxy-containing compounds, suitable PEG-containing compounds may contain various hydrophilic moieties familiar to the art. In addition to polyethyleneoxy groups, they may contain glyceryl, polyglyceryl, anhydrosorbityl or pentaerythrityl groups, and the like. With these compounds more than one hydroxyl group is present which must be capped to form the surfactants of the present invention. Small amounts of propyleneoxy groups may also be present. It is not desirable to employ PEG-containing compounds which possess more than about four hydroxyl groups because of the excessive amount of capping required.

Also contemplated are PEG-containing compounds in which sulfur or nitrogen linkages are involved, between the hydrophilic group and either the hydrophobic or the capping group. For example, ethoxylated mercaptans or ehtoxylated fatty amines can be used. Ethoxylated sulfonamides can also be used.

The hydophobic moiety may be straight chain, branched or cyclic. It may be alkyl, alkylaryl or arylalkyl.

The above-described compounds are converted to the emulsifiers of the present invention by reacting the free hydroxyls with a large carbon-containing reagent which caps, or covers up, the hydroxyls. The capping group will have the effect of lowering the hydrophilelipophile balance (HLB) of the PEG-containing compound because the capping group adds a hydrophobic moiety to the molecule. One must select the PEG-containing compound and the capping group to ensure that the capped emulsifier is within the desired HLB range. Enough capping reagent is used to cover up all the reactive —SH, —OH and —NH groups in the PEG-containing compound employed.

Carboxylic esters, carbamate esters and keto esters have been found to provide stable mixtures in ASA. Therefore, capping reagents suitable for use in preparing the compositions of the present invention are those which add an acyl cap to the starting REG-containing compound.

Contemplated capping reagents are those that form a carboxyl derivative linkage, such as ester, amide, carbamate, urea, and the like, to the hydrophilic moiety. Suitable reagents are carboxylic anhydrides, acid halides, isocyanates, ketene dimers, and the like, which are well known derivatives of carboxylic acids, including fatty and other natural acids, such as abietic.

While the capping reagents are normally monofunctional, they can also be difunctional or even trifunctional, as long as the structural requirements are met proportionately for each functional group. Examples of suitable difunctional reagents are the fatty acid dimer derivatives.

The following illustrates the range of suitable carbon-containing groups and reactive functions which may be combined to make suitable reagents. Carbon-containing groups include decyl, undecyl, dodecyl, tridecyl, tetradecyl, pentadecyl, hexadecyl, octadecyl, eicosyl, docosyl (all branched or straight chain), dicyclohexyl, decalyl, diphenyl and naphthyl. Reactive functions include anhydrides, acid halides, isocyanate, and isothiocyanate.

Capping reagents are preferred which require no catalyst or coreactant and which form no byproducts. Consequently, no additional processing steps are required. Examples of suitablle reagents include octadecyl isocyanate, and fatty acid ketene dimers.

The acyl capping group on the PEG-containing compound designated Y in the formula above, will generally contain from 10 to 40 carbon atoms. The capping group, being lipophilic, strongly alters the hydrophilelipophile balance (HLB) of the PEG-containing compound and may provide the sole effective hydrophobe in the emulsifier formed. Preferably, Y will contain from 12 to 35 carbon atoms. With a difunctional capping reagent, these numbers of carbon atoms may be doubled. Inert groups, such as an ether or thio linkage, may also be present. In addition, inert amide linkages, such as in carbamates derived from isocyanates, may be present. Inert carbonyl groups, such as those seen in keto esters obtained from reaction with a diketene, may be present. Inert halides may also be present.

If the capping group contains a reactive function such as the double bond in an oleyl ester, reactions known to the art may be performed with this function as long as the product conforms to the composition of this invention. For example, isomerization of an oleyl ester to an elaidyl ester yields a suitable emulsifier.

Examples of suitable capping groups on the emulsifier of the present composition include the following:

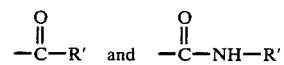

wherein R' is an n-alkyl, isoalkyl, cycloalkyl or aryl group containing from 9 to 39 atoms;

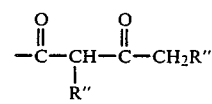

wherein R" is an n-alkyl, isoalkyl, cycloalkyl or aryl group containing from 3 to 18 carbon atoms; and

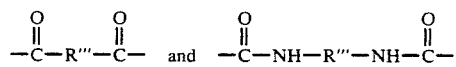

wherein R''' is an n-alkylene, isoalkylene, cycloalkylene or arylene group containing from 18 to 78 carbon atoms.

Specific examples of contemplated capping groups include:

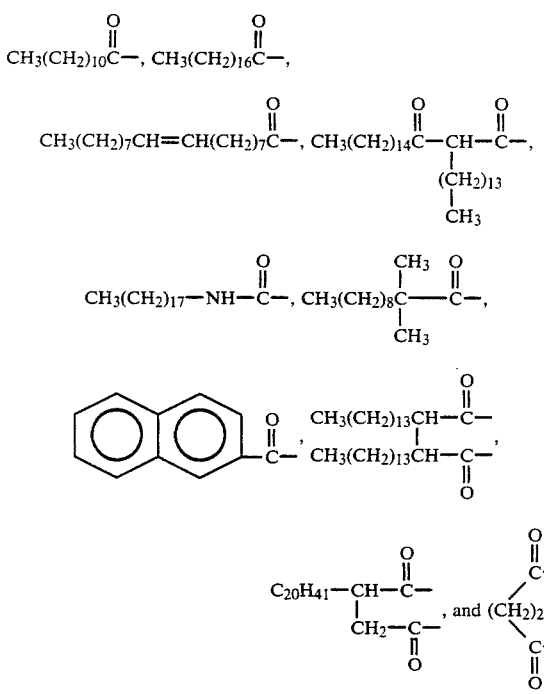

The hydrophobic/hydrophilic balance of the capped emulsifiers is in the normal emulsifier-detergent range. One way of defining this balance is by the use of the HLB scale (Hydrophile-Lipophile Balance). See P. Becker, Chapter 18, in "Nonionic Surfactants", M. J. Schick, Editor, Marcel Dekker (1967). The hydrophilelipophile balance is an indication of the size and stength of the hydrophilic (water-loving or polar) groups, and the lipophilic (oil-loving or non-polar) groups in a surfactant material expressed by a numerical value designated the HLB number. On that scale, for my oil-in-water capped emulsifiers, the HLB should be about 9 to 18, preferably 11 to 16.

The HLB may be estimated by comparison of various properties, such as water solubility, with emulsifiers of known HLB. Alternatively, the HLB may be calculated by several procedures known to the art. See, for example, J. T. Davies, Second Proceedings International Congress on Surface Activity, page 426 (1957). A simple approach with polyethyleneoxy-containing non-ionic compounds is to divide the weight percent polyethyleneoxide by five. I have estimated the HLB this way for several emulsifiers of the present composition. Very good ASA emulsions in water are obtained when the estimated HLB is in the 11 to 16 range.

The emulsifier of the present composition is prepared by reacting the unstable hydroxyl-containing compound described above with the capping reagent until the hydroxyl groups have reacted. Generally, from a few minutes to several hours are required for this reaction at temperatures from about 80° C. to 200° C. With catalysts, lower temperatures and shorter times may be employed. The ester derivatives, which would normally be made from carboxylic anhydride or acid halide reagents, could alternatively be prepared from a carboxylic acid or ester by other esterification reactions well known to the art, such as acid-catalyzed esterification or base-catalyzed ester interchange. Before making the ASA/emulsifier composition of the present invention, it is preferable to remove any byproducts which may have been formed, such as water, fatty acid or hydrogen chloride. The capped emulsifier is then blended into the ASA, yielding the ASA/emulsifier composition of the invention.

Alternatively, when the capping reagent is sufficiently reactive, the hydroxyl-containing emulsifier may be first dissolved in the ASA and then reacted with the capping reagent.

The ASA/emulsifier compositions of the present invention comprise 70 to 99.5 parts by weight, preferably 80 to 98 parts, of the substituted succinic anhydride and 0.5 to 30 parts by weight, preferably 2 to 20 parts, of the capped emulsifier. These ASA/emulsifier combinations are easy to make at a central location and can be stored and shipped to the location where the ASA emulsions will be made. The two components are miscible and the mixture is liquid at ambient temperatures.

This ASA/emulsifier composition readily emulsifies into water of various hardness and pH with simple mixing in the absence of high shear. Fine droplets are formed and the emulsion is stable until it is used for treating a surface which contains groups reactive to the anhydride. The time between formation and use could range from a few seconds to several hours. Longer times are generally not preferred because the anhydride groups will gradually be hydrolyzed by the water present.

The water used can be relatively pure or can contain the usual impurities in domestic water. It can have a pH above or below 7, generally in the range of 3 to 11. Calcium and magnesium hardness ions may be present.

The amount of ASA suspended in the water can vary widely, from a few parts per million to 10% or more depending on the use and method of application. For wood or fabric treatment, concentrations around 1% may be used, whereas for internal paper sizing, the concentration in the pump slurry is normally below about 100 parts per million. Thereby about 0.1 to 1% of ASA is finally absorbed on the paper.

Surfaces to be treated with the ASA/emulsifier compositions of the invention to gain water repellency will contain integral groups which are reactive to the ASA anhydride group. This normally will involve reaction with groups such as hydroxyl, amino or mercapto. A preferred type of material which may be treated with emulsions of the compositions of the invention contains carbohydrate molecules, such as cellulose or starch, at the surface of the material. These materials contain many hydroxyl groups which can react with the ASA.

As stated above, the ASA/emulsifier compositions of the present invention may be used to impart water repellency to cellulosic materials. The water-repellent compositions described above are preferably applied to the material in aqueous emulsions. The emulsion may be sprayed onto the material or the material may be dipped into the emulsion in order to distribute the derivative evenly throughout the material. The impregnated material is then withdrawn from the solution and air dried. After air drying, the material is then heated, preferably to a temperature in excess of 100° C., to effect a curing of the impregnated agent within the material. It has been found that one may conveniently use a temperature of about 125° C. for a period of 15 to 20 minutes. At lower temperatures, longer periods of time are required to effect the curing process. Lower temperatures and shorter times may be used if an acylation catalyst is present. To be commercially practical, the curing time should be as short as possible and generally less than one hour. At higher temperatures, the heat curing may be accomplished in shorter periods of time. The upper limit of temperature at which the heat curing process may be carried out is limited to the temperatures at which the cellulosic material begins to decompose. Using the composition of the present invention, it is preferred to impregnate the material with from about 0.5 to 3% by weight of the material of the ASA/emulsifier composition.

The ASA/emulsifier compositions of the present invention may additionally be used as paper sizing agents. These novel sizing agents display all of the features and advantages of prior art sizing agents. Moreover, the novel sizing agents of this invention impart to paper sized therewith a particularly good resistance to acidic liquids such as acid inks, citric acid, lactic acid etc. as compared to paper sized with the sizing agents of the prior art. In addition to the properties already mentioned, these sizing agents may also be used in combination with alum as well as with any of the pigments, fillers and other ingredients which may be added to paper. The sizing agents of the present invention may also be used in conjunction with other sizing agents so as to obtain additive sizing effects. A still further advantage is that they do not detract from the strength of the paper and when used with certain adjuncts will, in fact, increase the strength of the finished sheets. Only mild drying or curing conditions are required to develop full sizing value.

The actual use of these sizing agents in the manufacture of paper is subject to a number of variations in technique, any of which may be further modified in light of the specific requirements of the practitioner. It is important to emphasize, however, that with all of these procedures, it is most essential to acheive a uniform dispersal of the sizing agent throughout the fiber slurry, in the form of minute droplets which can come in intimate contact with the fiber surface. Uniform dispersal may be obtained by adding the sizing agent to the pulp or by adding a previously formed, fully dispersed emulsion. Chemical dispersing agents may also be added to the fiber slurry.

Another important factor in the effective utilization of the sizing agents of this invention involves their use in conjunction with a material which is either cationic in nature or is, on the other hand, capable of ionizing or dissociating in such a manner as to produce one or more cations or other positively charged moieties. These cationic agents, as they will be hereinafter referred to, have been found useful as a means for aiding in the retention of sizing agents herein as well as for bringing the latter into close proximity to the pulp fibers. Among the materials which may be employed as cationic agents in the sizing process, one may list alum, aluminum chloride, long chain fatty amines, sodium aluminate, substituted polyacrylamide, chromic sulfate, animal glue, cationic thermosetting resins and polyamide polymers.

Of particular interest for use as cationic agents are various cationic starch derivatives including primary, secondary, tertiary or quaternary amine starch derivatives and other cationic ntirogen substituted starch derivatives, as well as cationic sulfonium and phosphonium starch derivatives. Such derivatives may be prepared from all types of starches including corn, tapioca, potato, waxy maize, wheat and rice. Moreover, they may be in their original granule form or they may be converted to pregelatinized, cold water soluble products.

Any of the above noted cationic agents may be added to the stock, i.e., the pulp slurry, either prior to, along with, or after the additon of the sizing agent. However, in order to achieve maximum distribution, it is preferable that the cationic agent be added either subsequent to or in direct combination with the sizing agent. The actual addition to the stock of either the cationic agent or the sizing agent may take place at any point in the paper making process prior to the ultimate conversion of the wet pulp into a dry web or sheet. Thus, for example, these sizing agents may be added to the pulp while the latter is in the headbox, beater, hydropulper or stock chest.

Further improvements in the water resistance of the paper prepared with these novel sizing agents may be obtained by curing the resulting webs, sheets, or molded products. This curing process involves heating the paper at temperatures in the range of from 80° to 150° C. for periods of from 1 to 60 minutes. However, it should again be noted that post curing is not essential to the successful operation of this invention.

The sizing agents of this invention may, of course, be successfully utilized for the sizing of paper prepared from all types of both cellulosic and combinations of cellulosic with non-cellulosic fibers. The cellulosic fibers which may be used include bleached and unbleached sulfate (kraft), bleached and unbleached sulfite, bleached and unbleached soda, neutral sulfite, semichemical chemiground-wood, ground wood, and any combination of these fibers. These designations refer to wood pulp fibers which have been prepared by means of a variety of processes which are used in the pulp and paper industry. In addition, synthetic fibers of the viscose rayon or regenerated cellulose type can also be used.

All types of pigments and fillers may be added to the paper which is to be sized with the novel sizing agents of this invention. Such materials include clay, talc, titanium dioxide, calcium carbonate, calcium sulfate, and diatomaceous earths. Other additives, including alum, as well as other sizing agents, can also be used with these sizing agents.

With respect to proportions, the sizing agents may be employed in amounts ranging from about 0.05 to about 3.0% of the dry weight of the pulp in the finished sheet or web. While amounts in excess of 3% may be used, the benefits of increased sizing properties are usually not economically justified. Within the mentioned range the precise amount of size which is to be used will depend for the most part upon the type of pulp which is being utilized, the specific operating conditions, as well as the particular end use for which the paper is destined. Thus, for example, paper which will require good water resistance or ink holdout will necessitate the use of a higher concentration of sizing agent than paper which does not.

The following examples are provided to illustrate the invention in accordance with the principles of this invention but are not to be construed as limiting the invention in any way except as indicated by the appended claims.

EXAMPLES

Example 1

The alkenyl succinic anhydride (ASA) employed in this example was a commercial type of liquid $C_{15-20}$ ASA prepared by the "Ene" reaction of maleic anhydride with $C_{15-20}$ olefins. The olefins consisted of a 50/50 mixture of straight chain internal olefins and branched chain propylene oligomer, both of which covered the $C_{15}$-$C_{20}$ range, inclusive.

A 10% solution of Igepal CO-630, a commercial nonionic oil-in-water emulsifier, was made in the above ASA. This was a clear homogeneous solution at room temperature. One drop (0.026 g) of this mixture was shaken with 25 ml of water for 15 seconds in a stoppered graduate. A stable white emulsion was formed. This emulsifier, which has an HLB of 13.0, is therefore an excellent emulsifier for ASA when freshly mixed.

The 10% emulsifier in ASA mixture was allowed to stand at room temperature. After one week it would no longer form a stable emulsion. Similarly, when aging was accelerated by heating for 3 hours at 80° C., the mixture would not form a stable emulsion.

Similar results were obtained with six other commercial emulsifiers, namely, Tergitol TMN-6, Tergitol 15-S-12, Triton X-114, Triton X-100, Igepal CO-620, and Igepal CO-720. After heating for three hours at 80° C., the 10% mixtures in ASA had lost their self-emulsifying power. The HLB of these emulsifiers ranged from 11.7 to 14.5.

This example shows that commercial emulsifiers, which form excellent emulsions when freshly mixed with ASA, do not form stable emulsions with ASA after aging the mixture.

Example 2

Igepal CO-850 was mixed in a 1/1 mole ratio with lauroyl chloride and heated at 80° C. for sixteen hours, and then at 100° C. for 7 hours under vacuum to remove HCl. Infrared analysis of the mixture indicated that the acid chloride had been consumed, and an ester had formed. An intense ester carbonyl absorption at 1735 $cm^{-1}$ was present. The acid chloride carbonyl absorption at 1800 $cm^{-1}$ had disappeared. The hydroxyl absorption at 3480 $cm^{-1}$ of the alkylphenol ethoxylate had disappeared.

The HLB of this capped emulsifier is estimated at 13.7, assuming that Igepal CO-850 is an ethoxylated nonyl phenol containing 20 ethylene oxide units.

Example 3

The capped emulsifier of Example 2 was mixed into the ASA of Example 1 at the 10% level. A homogeneous solution at room temperature was obtained.

When this mixture was tested for emulsifying power by the procedure described in Example 1, it formed a good emulsion in water. However, in this case, the mixture was stable to storage. After accelerated aging, 3 hours at 80° C., it still gave a good emulsion.

Therefore, this ASA/emulsifier composition, which is stable to storage, exemplifies the present invention.

Example 4

Igepal CO-850 was mixed in a 1/1 mole ratio with octadecyl isocyanate and heated at 100° C. for seventeen hours, plus 4 hours at 120° C. Infrared examination of the product showed that the hydroxyl absorption at 3480 $cm^{-1}$ had disappeared, an N-H band was present at 3340 $cm^{-1}$, and a large carbamate carbonyl band was present at 1720 $cm^{-1}$.

The HLB of this capped emulsifier is estimated at 12.6. The octadecyl isocyanate reagent is advantageous in that no by-product is formed in the capping step.

Example 5

The capped emulsifier of Example 4 was mixed into the ASA of Example 1 at the 10% level. A homogeneous solution was obtained.

When this mixture was tested for emulsifying power by the procedure described in Example 1, it formed an excellent emulsion in water. However, in this case, the mixture was stable to storage. After accelerated aging, 3 hours at 80° C., it still gave an excellent emulsion.

Therefore, this ASA/emulsifier composition, which is stable to storage, exemplifies the present invention.

Example 6

The same procedures and tests as in Examples 2 and 3 were carried out starting with Igepal CO-720 and, in each case, capping with one mole of decanoyl, lauroyl and stearoyl chloride. In each case, the final ASA/emulsifier mixture was stable to storage, producing as good an emulsion in water after heating at 80° C. for 3 hours as when freshly mixed. The emulsion quality was not as good as the emulsion of Examples 3 and 5.

The capped emulsifier HLB is estimated at 11.7 for the decanoyl cap, 11.3 for the lauroyl, and 10.4 for the stearoyl, assuming Igepal CO-720 contains 12 ethylene oxide units.

Example 7

The same experiments as in Example 6 were carried out with naphthoic acid chloride as the capping agent for Igepal C0-720. In this case, again, the same quality emulsin was produced before and after accelerated aging. The HLB is estimated at 11.7.

Example 8

The same procedures as in Examples 2 and 3 were carried out capping with stearoyl chloride, in one case, Igepal CO-850, and in another, Igepal CO-880. In each case, the ASA/capped emulsifier mixture was stable to accelerated aging. Very good emulsions in water were formed both before and after heating.

The HLB for the capped Igepal CO-850 is estimated at 12.9 and the HLB for the capped Igepal CO-880 is estimated at 14.6, assuming that Igepal CO-880 contains 30 ethylene oxide units.

Example 9

The same procedures as in Examples 2 and 3 were carried out starting with methoxy polyethylene glycols (MPG 350, MPG 550 and MPG 750) as the polyethyleneoxy-containing moiety and capping separately with the acid chlorides of lauric and stearic acid. The capped polyethyleneoxy-containing compounds prepared were MPG 350-laurate (estimated HLB, 12.0), MPG 550-laurate (HLB, 14.0), MPG 550-stearate (HLB, 12.7), and MPG 750-stearate (HLB, 14.1). In each case, the ASA/emulsifier mixture formed a stable emulsion in water both before and after accelerated aging. The latter three emulsifiers formed the best emulsions.

Example 10

The same procedures as in Examples 2 and 3 were carried out using lauric acid chloride as the capping agent for two alcohol ethoxylates. In one case, an ethoxylate of lauryl alcohol which contained an average of 23 ethylene oxide units was used. In the other case, the ethoxylate of oleyl alcohol with 20 ethylene oxide units was used. The estimated HLB values were 14.7 and 13.2, respectively.

In both cases, the mixture of emulsifier with ASA was stable to accelerated aging. The oleyl emulsifier produced somewhat better emulsions than the lauryl emulsifier.

What is claimed is:

1. A stable hydrocarbyl-substituted succinic anhydride/emulsifier composition comprising:
   (A) 70 to 99.5% of a normally liquid hydrocarbyl-substituted succinic anhydride containing from 6 to 50 carbon atoms in the substituent; and
   (B) 0.5 to 30% of an emulsifier of the formula:

$R-W-Y_n$ wherein
   R is a hydrophobic alkyl, alkylaryl, or arylalkyl group containing from 1 to 30 carbon atoms;
   W is a water-soluble polyethyleneoxy-containing group having from 4 to 150 ethylene oxide units which is independently connected to R and Y through oxygen, sulfur or nitrogen linkages;
   Y is an acyl capping group for the oxygen, sulfur or nitrogen linkages on W not connected to R, wherein Y contains from 10 to 40 carbon atoms;
   n is ½, 1, 2, or 3;
   and the hydrophile-lipophile balance is between about 9 and 18 on the HLB scale.

2. The composition according to claim 1, wherein the hydrocarbyl substituent of component (A) is selected from the group consisting of alkyl, alkenyl and aralkyl.

3. The composition according to claim 2, wherein the hydrocarbyl substituent of component (A) is alkenyl.

4. The composition according to claim 1, wherein the hydrocarbyl substituent of component (A) contains from 10 to 30 carbon atoms.

5. The composition according to claim 4, wherein the hydrocarbyl substituent of component (A) contains from 12 to 25 carbon atoms.

6. The composition according to claim 1, wherein W has from 5 to 80 ethylene oxide units.

7. The composition according to claim 1, wherein W is connected to R and Y through oxygen linkages.

8. The composition according to claim 1, wherein Y contains from 12 to 35 carbon atoms.

9. The composition according to claim 1, wherein R—W— is derived from hyroxyl-containing compounds selected from the group consisting of:

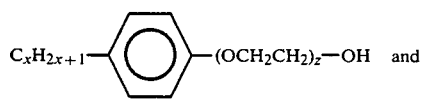

wherein x is an integer from 8 to 24 and z is an integer from 10 to 80.

10. The composition according to claim 1, wherein Y is selected from the group consisting of:

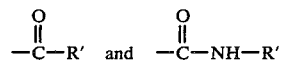

wherein R' is an n-alkyl, isoalkyl, cycloalkyl or aryl group containing from 9 to 39 carbon atoms;

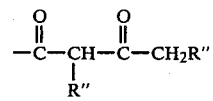

wherein R" is an n-alkyl, isoalkyl, cycloalkyl or aryl group containing from 3 to 18 carbon atoms; and

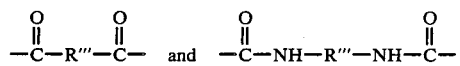

wherein R''' is an n-alkylene, isoalkylene, cycloalkylene or arylene group containing from 18 to 78 carbon atoms.

11. The composition according to claim 10, wherein Y is selected from the group consisting of:

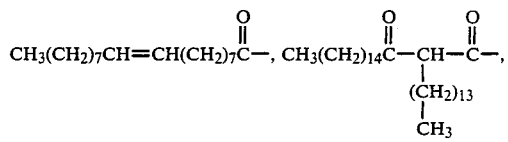

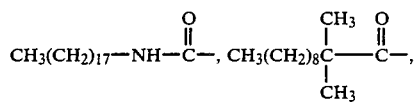

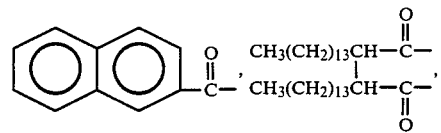

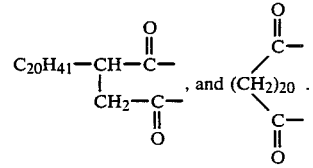

12. The composition according to claim 1, wherein the emulsifier of component (B) has a hydriphile-lipophile balance of about 11 to 16 on the HLB scale.

13. The composition according to claim 1, wherein the composition is in the form of an aqueous emulsion.

14. A method of imparting water repellency to surfaces containing groups reactive to anhydrides which comprises impregnating said surfaces with an aqueous emulsion of the composition of claim 1.

15. The method of claim 14, wherein said surfaces are cellulosic materials.

16. A method of sizing paper which comprises the step of intimately dispersing within the wet pulp, prior to the ultimate conversion of said pulp into a dry web, an aqueous emulsion of the composition of claim 1.

* * * * *

UNITED STATES PATENT AND TRADEMARK OFFICE
CERTIFICATE OF CORRECTION

PATENT NO. : 4,545,856
DATED : October 8, 1985
INVENTOR(S) : William Alan Sweeney It is certified that error appears in the above-identified patent and that said Letters Patent are hereby corrected as shown below:

Column 3, Line 67, "REG-containing" should read --PEG-containing--.

Claim 9, Column 11, Line 57, "hyroxyl" should read --hydroxyl--.

Signed and Sealed this

Ninth Day of September 1986

[SEAL]

Attest:

DONALD J. QUIGG

Attesting Officer

Commissioner of Patents and Trademarks